United States Patent [19]

Sung et al.

[11] Patent Number: 5,768,372
[45] Date of Patent: Jun. 16, 1998

[54] METHOD AND APPARATUS FOR SECURING PROGRAMMING DATA OF A PROGRAMMABLE LOGIC DEVICE

[75] Inventors: Chiakang Sung, Milpitas; Bonnie I. Wang, Cupertino, both of Calif.

[73] Assignee: Altera Corporation, San Jose, Calif.

[21] Appl. No.: 617,664

[22] Filed: Mar. 13, 1996

[51] Int. Cl.[6] ........................... H04L 9/00; H03K 19/007
[52] U.S. Cl. ................................ 380/3; 380/4; 380/50; 326/8; 326/38
[58] Field of Search ........................... 380/4, 50, 9, 3, 380/6; 257/209, 529; 326/8

[56] References Cited

U.S. PATENT DOCUMENTS

| | | | |
|---|---|---|---|
| 4,609,986 | 9/1986 | Hartmann et al. | 364/20 C |
| 4,617,479 | 10/1986 | Hartmann et al. | 307/465 |
| 4,677,318 | 6/1987 | Veenstra | 307/465 |
| 4,713,792 | 12/1987 | Hartmann et al. | 364/900 |
| 4,774,421 | 9/1988 | Hartmann et al. | 307/465 |
| 4,871,930 | 10/1989 | Wong et al. | 307/465 |
| 4,899,067 | 2/1990 | So et al. | 307/465 |
| 4,912,342 | 3/1990 | Wong et al. | 307/465 |
| 5,033,084 | 7/1991 | Beecher | 380/4 |
| 5,081,675 | 1/1992 | Kittirutsunetorn | 380/4 |
| 5,121,006 | 6/1992 | Pedersen | 307/465 |
| 5,220,214 | 6/1993 | Pedersen | 307/465 |
| 5,260,610 | 11/1993 | Pedersen et al. | 307/465 |
| 5,260,611 | 11/1993 | Cliff et al. | 307/465 |
| 5,350,954 | 9/1994 | Patel | 307/465 |
| 5,371,422 | 12/1994 | Patel et al. | 326/41 |
| 5,388,157 | 2/1995 | Austin | 380/4 |
| 5,479,512 | 12/1995 | Weiss | 380/28 |
| 5,513,262 | 4/1996 | Van Rumpt et al. | 380/29 |
| 5,548,228 | 8/1996 | Madurawe | 326/41 |
| 5,563,592 | 10/1996 | Cliff et al. | 341/63 |
| 5,581,198 | 12/1996 | Trimberger | 326/38 |
| 5,636,281 | 6/1997 | Antonini | 380/25 |

OTHER PUBLICATIONS

Minnick, R.C., "A Survey of Microcellular Research," Journal of the Association for Computing Machinery, vol. 14, No. 2, pp. 203–241, Apr. 1967.

Wahlstrom, S.E., "Programmable Logic Arrays—Cheaper by the Millions," Electronics, Dec. 11, 1967, pp. 90–95.

Recent Developments in Switching Theory, A. Mukhopadhyay, ed., Academic Press, New York, 1971, chapters VI and IX, pp. 229–254 and 369–422.

Primary Examiner—Thomas H. Tarcza
Assistant Examiner—Pinchus M. Laufer
Attorney, Agent, or Firm—Fish & Neave; Jeffrey H. Ingerman

[57] ABSTRACT

An SRAM-based programmable logic device having decompression and decryption circuits between its EPROM nonvolatile programming data storage and its SRAM programming registers is secured against copying of the programming data because a would-be copyist would need to know the compression and encryption used. In a system and method for programming the device, a user station preferably contains a plurality of possible encryptions and a plurality of possible compression schemes. An encryption and compression scheme are selected, preferably at random, by the user or by the programming software in the user station. Data indicating which encryption and compression scheme were chosen are included in the programming data to allow decompression and decryption.

41 Claims, 5 Drawing Sheets

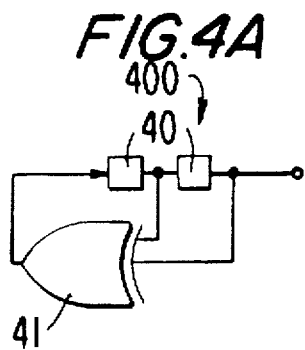
FIG.4A
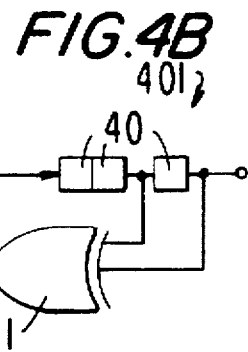
FIG.4B
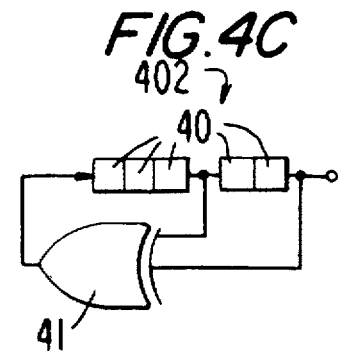
FIG.4C
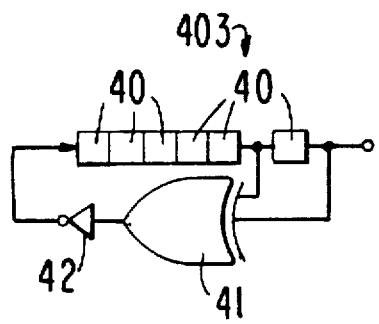
FIG.4D
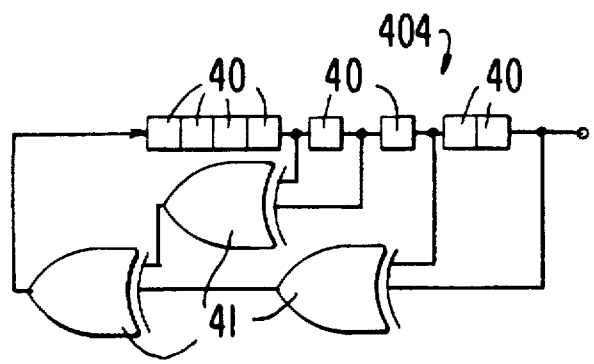
FIG.4E
GOLOMB ENCODING (k=4):
| ENCODED DATA | | DATA STRING (OUTPUT) |
|---|---|---|
| 00100 | → | 0000 0000 1 |
| 00101 | → | 0000 0000 01 |
| 00110 | → | 0000 0000 001 |
| 00111 | → | 0000 0000 0001 |
| 000111 | → | 0000 0000 0000 0001 |
| 100 | → | 1 |
| 101 | → | 01 |
FIG.6

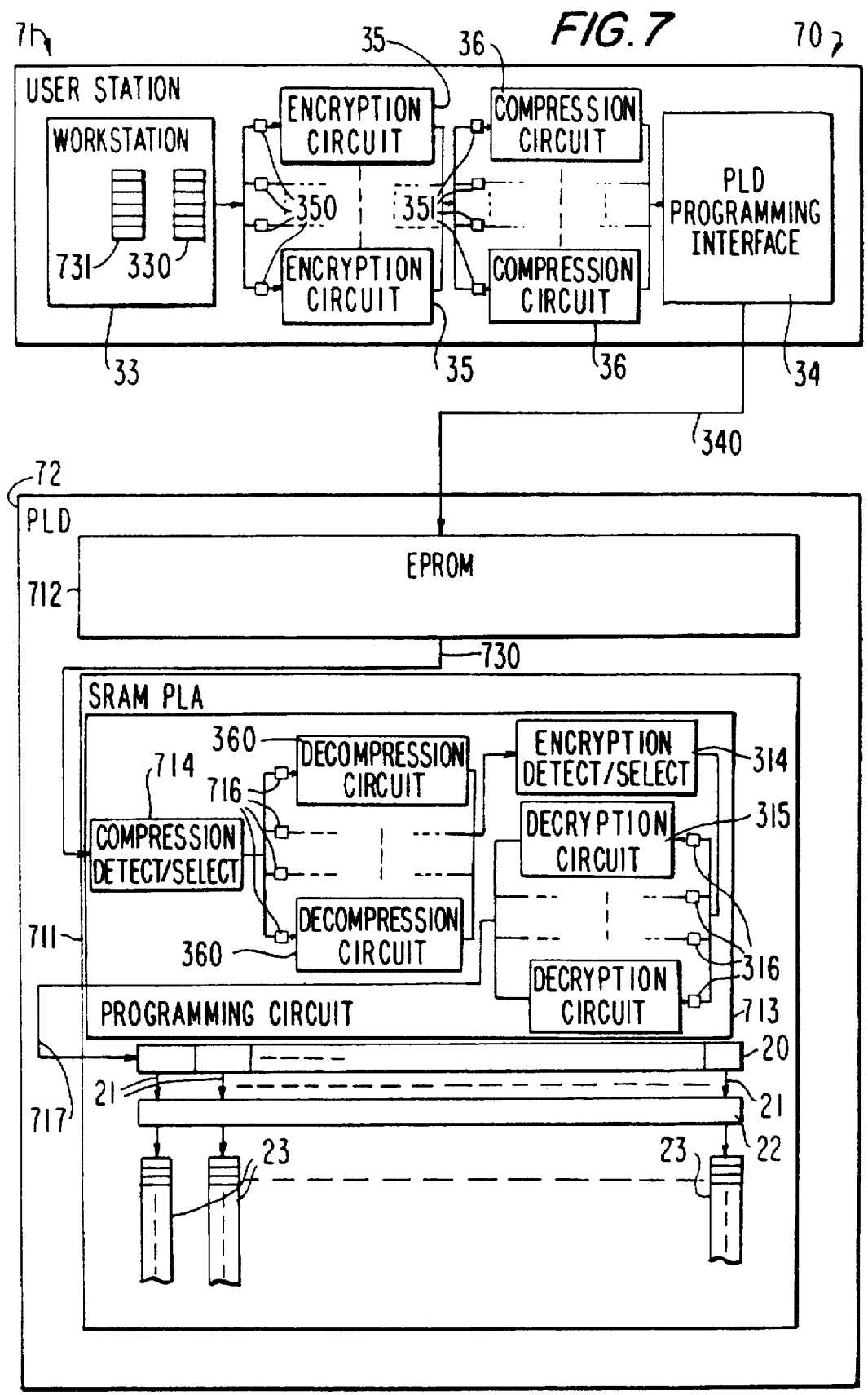

METHOD AND APPARATUS FOR SECURING PROGRAMMING DATA OF A PROGRAMMABLE LOGIC DEVICE

BACKGROUND OF THE INVENTION

This invention relates to a method and an apparatus for securing the programming data of a programmable logic device against copying, and to a programmable logic device so secured.

Programmable logic devices are well known. In one class of known programmable logic devices, each device has a large number of logic gates, and a user programs the device to assume a particular configuration of those logic gates, frequently using a software tool provided by the manufacturer of the device, with the software tool being executed on a computer having an adapter into which the device is inserted. Such devices typically used some form of programmable read only memory ("PROM") technology to store the configuration data produced by the software tool. In early generations of such devices, the software tool caused the computer to "burn" the pattern into the PROM storage by fusing fusible links. In later generations, the PROM technology may have been erasable programmable read-only memory ("EPROM") technology, which was not burned, and could be erased (for reprogramming) by exposure to ultraviolet light. Still later generations may have used electrically erasable programmable read-only memory ("EEPROM" or "E²PROM") technology.

All of those technologies were relatively secure. In the case of a user who requires a relatively small volume of a custom integrated circuit, that user might choose to use a programmable logic device rather than incur the effort and expense of a developing a custom chip. If a competitor of that user were to try to reverse engineer the programmed programmable logic device, the competitor would essentially have to slice the device layer by layer to discern its programming. While such an effort might be technically feasible, for the types of users being discussed, who by definition are not chip manufacturers, the likelihood that a competitor could or would undertake the effort is small.

More recently, programmable logic devices that store their configuration data in static random access memory ("SRAM") storage have become available. Such devices have the advantage of being faster than the devices based on EPROM technology, because the SRAM storage operates faster than the EPROM storage.

However, SRAM storage is volatile; it does not retain its contents when power is lost. Therefore, programmable logic devices based on SRAM technology must have nonvolatile storage as well, to retain the configuration programming data during times that the device is switched off or otherwise not provided with power. Such nonvolatile storage may be provided, for example, in the form of EPROM storage, although any form of nonvolatile storage may be used.

Whatever type of nonvolatile storage is used, an SRAM programmable logic device having nonvolatile storage of its configuration data is less secure against reverse engineering by a competitor of its user. That is because a competitor can monitor the data flowing out of the nonvolatile storage on power-up, and thereby determine the programming configuration of the programmable logic device. Indeed, the competitor need not even analyze the data stream, but need only record it and store it in its own devices.

It would be desirable to be able to provide an SRAM-based programmable logic device, with nonvolatile storage, that is nevertheless secure against copying of the programming data.

It would also be desirable to be able to provide such an SRAM-based programmable logic device that relies on multiple levels of security.

SUMMARY OF THE INVENTION

It is an object of this invention to provide an SRAM-based programmable logic device, with nonvolatile storage, that is nevertheless secure against copying of the programming data.

It is also an object of this invention to provide such an SRAM-based programmable logic device that relies on multiple levels of security.

In accordance with the present invention, there is provided a system for securing digital programming data of a programmable logic device that has volatile memory for storing digital programming data and nonvolatile memory from which the digital programming data are loaded into the volatile memory. The system includes a plurality of encryptors, an encryptor selector for selecting one of the plurality of encryptors and encrypting the digital programming data therewith, and a storage controller for storing the encrypted digital programming data in the nonvolatile memory along with encryption selection data identifying that one of the plurality of encryptions.

A method of operating such a system, and a programmable logic device used in such a system, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 4A–4E are schematic block diagrams of encryption circuits of the type that may be used in the present invention;

Figure 5:
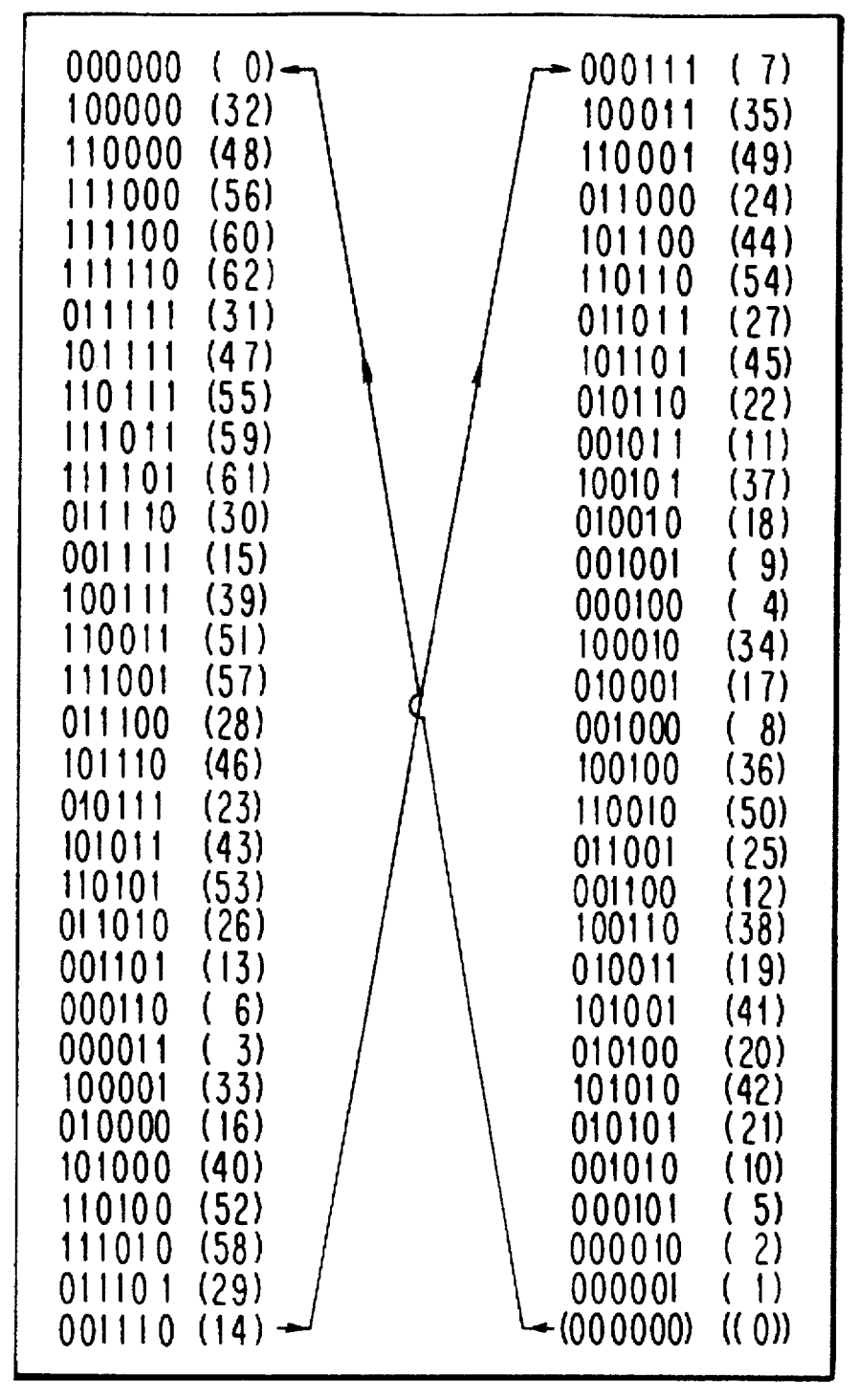

FIG. 5 is a state table showing the result of the operation of the encryption circuit of FIG. 4D;

FIG. 6 is a table showing the operation of a compression scheme that may be used in the present invention; and FIG. 7 is a schematic block diagram of a second preferred embodiment of a system according to the present invention for securing the programming data of a programmable logic device.

DETAILED DESCRIPTION OF THE INVENTION

Figure 1:
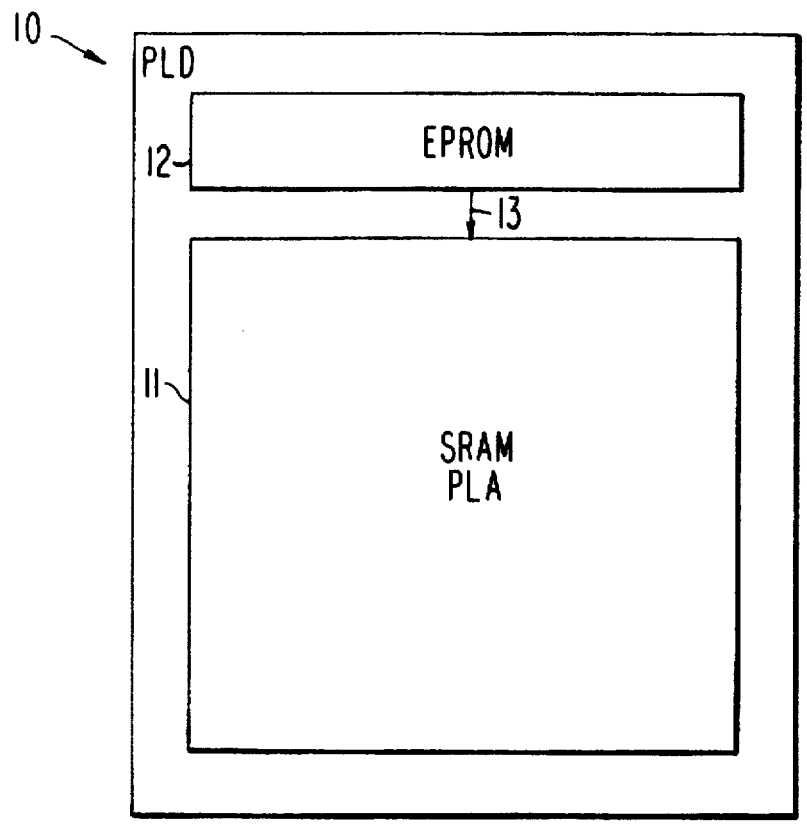
FIG. 1 is a schematic block diagram of a previously known programmable logic device of the type described above.

The present invention provides security for the programming data of a programmable logic device of the type described above, having volatile programming memory and nonvolatile storage for maintaining the programming data during periods when power is not supplied, by encrypting the programming data before they are stored in the nonvolatile storage (such as EPROM storage). The programming circuitry which reads the programming data from the nonvolatile storage into the volatile programming memory is programmed with the necessary decryption circuitry or software to decrypt the encrypted programming data before writing the data to the volatile program memory.

Preferably, the system and method according to the invention include a plurality of possible encryptions and use one of those plurality of encryptions on each particular set of programming data, so that not all sets of programming data are encrypted with the same encryption. Thus, if someone were to determine one of the encryptions, the remaining encryptions would still be secure. If multiple encryptions are used, it is then necessary to include, with the encrypted programming data, encryption selection data that would indicate which encryption was used, so that the proper decryption could be used by the programming circuitry. A person attempting to copy the programming data would have to be able not only to decrypt the encrypted data, but, even if he or she knew all of the potential encryptions, he or she also would have to know which decryption from among all of the available decryptions is associated with the particular encryption selection data.

In order to minimize the size of the nonvolatile storage needed to preserve the programming data, it is further preferable to compress the programming data after encryption and before storage in the nonvolatile storage. Decompression circuitry could be included in the nonvolatile storage so that the encrypted programming data and the associated encryption selection data could be read out of the nonvolatile storage in decompressed form. Alternatively, the decompression circuitry could be in the programming circuitry, so that the data transferred from the nonvolatile storage destined for the volatile program memory is compressed as well as encrypted. In such a case, the compression would serve as a second level of encryption. A person attempting to copy the programming data would have to determine the compression scheme as well as the encryption technique. Indeed, as in the case of the encryption technique, there could be more than one possible compression scheme, in which case compression selection data would have to be stored with the compressed encrypted data.

The encryption selection data cannot be encrypted. If they were encrypted, there would be no way to read them to determine which decryption to use. However, if compression were used, the unencrypted encryption selection data could be stored in compressed or uncompressed form. Similarly, if there were more than one possible compression scheme, the compression selection data could not be compressed. Otherwise, it would not be possible to determine what the compression scheme was.

There are a number of possible encryption techniques that can be used in the present invention. And within each of those techniques, there may be variants of that technique. Indeed, to produce the plurality of encryptions from which to select, it is preferable to adopt one type of encryption technique and then to adopt several variants of that technique. The choice of encryption technique will be governed by trade-offs among a number of factors, such as the time necessary to execute encryption and decryption, the relative complexity of the various techniques, the system resources available to execute the encryption or decryption, etc. For example, a more complex technique may be more secure, but may take an unacceptably long time to execute on available hardware, even though the execution time may be acceptable on other hardware.

One skilled in the art, taking into account these and other factors, can select any suitable encryption technique, preferably one capable of having a plurality of variants, from among the encryption techniques known to those of skill in the art. All other things being equal, it is believed that any such encryption technique is as good as any other. Accordingly, it is believed that a disclosure of any such technique is a disclosure of the best mode of carrying out the present invention. Therefore, the actual technique used by the assignee hereof in implementing the present invention will not be disclosed herein. To do so would defeat the security of assignee's products as soon as this is published. Instead, a technique other than assignee's actual technique will be disclosed below.

The same is true of the compression scheme. All other things being equal, any compression scheme that meets the system requirements is as good as any other, and the actual scheme used by the assignee hereof in implementing the present invention will not be disclosed herein to prevent compromise of the security of assignee's products when this is published. Instead, a scheme other than assignee's actual scheme will be disclosed below.

One suitable type of encryption which is well known to those of ordinary skill in the art is a pseudo-random sequence, which is produced by using a shift register feedback arrangement known as a pseudo-random sequencer. A pseudo-random sequencer can be made from a chain of any number n of shift registers, with any two or more bits in the chain extracted and combined by logic functions such as AND, OR or EXCLUSIVE-OR, or their inverted counterparts. Such sequencers produce apparently random outputs that repeat every $2^n-1$ cycles, where n is the number of registers.

The output of a pseudo-random sequencer can be decrypted by producing a look-up table of corresponding input and output states, and looking up the input state corresponding to each output state. That corresponding input state represents the original unencrypted data. There may be other ways of decrypting the output as well.

As an alternative, the original unencrypted data could be encrypted using a look-up table and decrypted using a pseudo-random sequencer. In such an implementation, the look-up table would be loaded with the intention that a particular pseudo-random sequencer would be used as the decryptor. Thus, for each potential sequence of digits in the unencrypted/decrypted data, the look-up table would be loaded in such a way that that sequence was translated into another sequence that, when passed through the pseudo-random sequencer, would be converted back to the original sequence.

A suitable compression scheme which is well known to those of ordinary skill in the art is Golomb encoding, in which each group of k zeroes in the uncompressed data is represented by a single zero in the compressed data. Ones are represented by ones, and by a binary remainder that indicates how many zeroes were found between the last group of four zeroes and the one. The variable "k" can be chosen to be any desired value. In one common case, k=4, in which case the binary remainder requires two digits to represent one, two or three zeroes. If Golomb encoding is used as the compression scheme in the present invention, and multiple compressions are desired, they can be accomplished by using different values of k. Of course, the different compressions also could be implemented with completely different encoding schemes.

Figure 2:
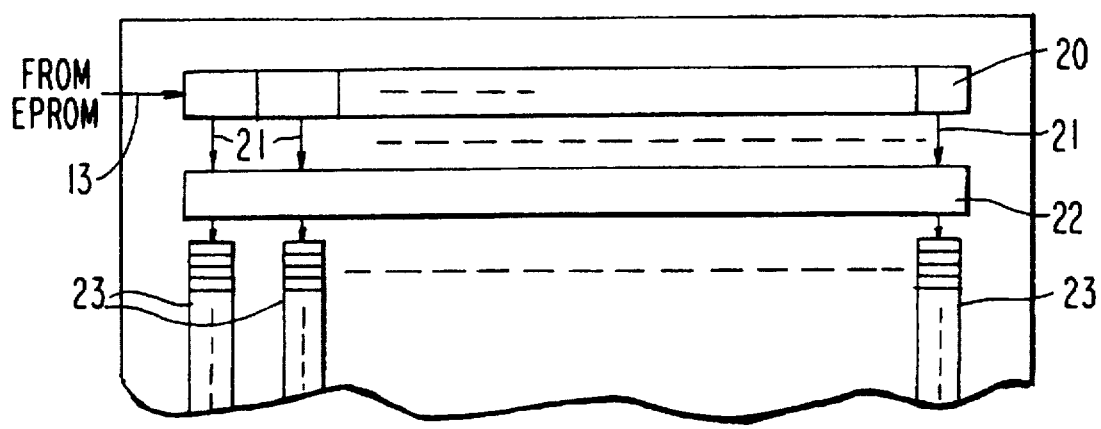
FIG. 2 is a schematic block diagram showing detail of a portion of the device of FIG. 1.

FIGS. 1 and 2 show a programmable logic device 10 of the type described above, without the security features of the present invention. Programmable logic device 10 includes SRAM-based programmable logic array 11 and a nonvolatile storage 12 for maintaining the SRAM programming data through periods during which power is not supplied. As shown in FIG. 1, nonvolatile storage 12 is an EPROM, although other nonvolatile storage technologies can be used.

When power is first applied to programmable logic device 10, programming data stored in nonvolatile storage 12 are output over connection 13 to programmable logic array 11. The data preferably are clocked serially into shift register chain 20. Preferably, when shift register chain 20 is filled, the data in shift register chain 20 are transferred over connections 21 to buffer 22, whence they are transferred to "columns" 23 of SRAM programming registers which configure the logic structure of programmable logic array 11. As data in buffer 22 are being transferred to columns 23, programming data preferably continue to be clocked into shift register chain 20 from nonvolatile storage 12 (until storage 12 is empty). By the time shift register chain 20 is full again, buffer 22 preferably is ready to receive data again, preferably allowing an uninterrupted flow of data out of nonvolatile storage 12 into shift register chain 20.

As described above, during this power-up programming sequence, someone intent on copying the programming data can read the programming data as they flow through connection 13. The present invention provides a method and system, and a programmable logic device for use therein, that prevents such "sniffing" of the programming data, as illustrated in FIGS. 3–7.

Figure 3:
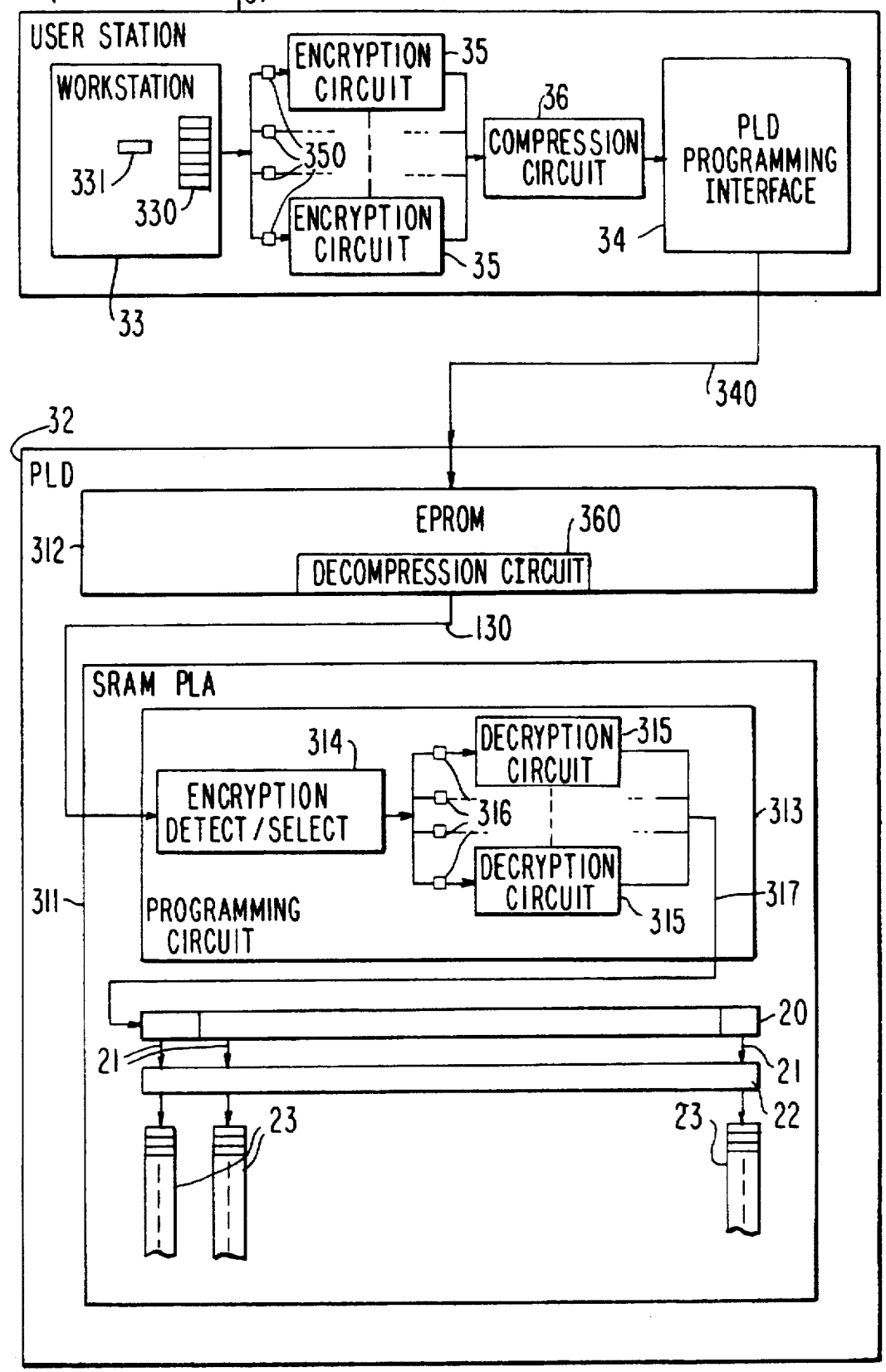
FIG. 3 is a schematic block diagram of a first preferred embodiment of a system according to the present invention for securing the programming data of a programmable logic device.

A first preferred embodiment of a system 30 according to the present invention is shown in FIG. 3. System 30 includes a user station 31 and programmable logic device 32. User station 31 includes a workstation 33 connected to a programmable logic device programming interface 34. Workstation 33 is preferably a conventional personal computer running programmable logic device programming software such the MAX+PLUS II (Version 6.1) programming software available from the assignee hereof, while interface 34 is preferably an interface operatively connected to an output of workstation 33, preferably having a socket into which programmable logic device 32 may be inserted for programming. Included in the connection between workstation 33 and interface 34 preferably is at least one encryption circuit 35. Preferably, also included in the connection between workstation 33 and interface 34 is a compression circuit 36.

Programmable logic device 32 preferably includes a nonvolatile storage 312 similar to nonvolatile storage 12 (again, preferably an EPROM), except that nonvolatile storage 312 preferably includes a decompression circuit 360 in its output stage, capable of decompressing data compressed by compression circuit 36.

Programmable logic device 32 also preferably includes an SRAM-based programmable logic array 311, similar to programmable logic array 11, but having a programming circuit 313. Programming circuit 313 includes an encryption detect/select circuit 314, and at least one decryption circuit 315.

In use, a user desiring to program programmable logic device 32 would enter the desired programming configuration into workstation 33 as with the previously known systems described above. However, before the programming data are transferred via programming interface 34 to programmable logic device 32, they preferably pass through, and are encrypted by, encryption circuit 35, which preferably implements one of a plurality of available encryptions as discussed above and described in more detail below, and preferably adds encryption selection data to the encrypted data, which indicate which of the available encryptions was used. Optionally, but preferably, the encrypted data are then compressed by compression circuit 36, primarily to save space in nonvolatile storage 312. The encrypted and preferably compressed programming data are then passed to programming interface 34, whence they are loaded through connection 340 into nonvolatile storage 312.

Each time that now-programmed programmable logic device 32 is powered up, the encrypted programming data are output by nonvolatile storage 312 as in previously known devices, and transferred to SRAM-based programmable logic array 311 over connection 130. Unlike the data on connection 13 of FIG. 1, the programming data on connection 130 cannot be read by someone intent on copying them, because of the encryption. (In the embodiment shown, decompression circuit 360 is included in the output stage of nonvolatile storage 312, and thus the data on connection 130 are not compressed, so the would-be copyist is not hindered by the compression of the data.)

The encrypted programming data are nevertheless useful to programmable logic array 311 because it includes programming circuit 313 capable of decrypting the programming data. Programming circuit 313 includes encryption detect/select circuit 314 which detects and reads the encryption selection data to determine which of the available encryptions was used to encrypt the programming data. The encryption selection data are preferably used to actuate an appropriate selector switch 316 which selects one of several decryption circuits 315, each of which corresponds to, and is capable of decrypting, one of the available encryptions. The programming data are then decrypted by the selected decryption circuit 315 and are output via connection 317 to shift register 20 as in the previously known devices.

Although it is set forth above that user station 31 has one encryption circuit 35 using one of a plurality of encryptions, user station 31 more preferably, as shown in FIG. 3, has a plurality of encryption circuits 35 corresponding to some or all of the available encryptions. Either the programming software in workstation 33, or the user, selects which of the encryptions to use, preferably at random, activating the correct selector switch 350 to actuate the corresponding encryption circuit 35.

The various encryption circuits 35 can be various pseudorandom sequencers as discussed above and as shown in FIGS. 4A–4E. Sequencer 400 (FIG. 4A) is a chain of two shift registers 40, in which the contents of both registers are passed through EXCLUSIVE-OR gate 41 and fed back. Sequencer 400 has $2^2-1=3$ states, so would not produce a very secure encryption. Sequencer 401 (FIG. 4B) is a three-register chain, with the contents of the second and third registers 40 EXCLUSIVE-ORed and fed back. Sequencer 401 has $2^3-1=7$ states, and thus produces a somewhat more secure encryption than sequencer 400. Sequencer 402 (FIG. 4C) is a five-register chain, with the contents of the third and fifth registers 40 EXCLUSIVE-ORed and fed back. Sequencer 402 has $2^5-1=31$ states, and thus produces an even more secure encryption than sequencer 401. Sequencer 403 (FIG. 4D) is a six-register chain, with the contents of the fifth and sixth registers 40 EXCLUSIVE-ORed and fed back through an inverter 42. Sequencer 403 has $2^6-1=63$ states, and thus produces a still more secure encryption than sequencer 402. Sequencer 404 (FIG. 4E) is the most complex sequencer shown, having eight registers 40, with the contents of the fourth and fifth registers 40 EXCLUSIVE-ORed and the contents of the sixth and eighth registers 40 EXCLUSIVE-ORed, and the outputs of those two EXCLUSIVE-ORs again EXCLUSIVE-ORed and then fed back. Sequencer 404 has $2^8-1=255$ states for an even more secure encryption.

To use one of these sequencers for encryption, n bits, where n is the number of registers 40 in the sequencer, would be clocked into the sequencer, and the sequencer would then be clocked once (or a set number of times) without inputting new data. The values of the bits in the n registers would advance to the next state (or a set number of states ahead) of the sequencer. The values of the n registers would be output in parallel, and would replace in the encrypted data the n bits of the unencrypted data. n more bits would then be clocked into the sequencer, and the process would repeat.

The particular sequencer used would be chosen according to the factors discussed above, including available resources and the time available to execute the encryption. A reasonable selection might be a six-register sequencer, such as sequencer 403, which has the sixty-three states shown in FIG. 5 in both binary and decimal form. Sequencer 403 would step, on each successive clock cycle, through the states shown in the order shown. Thus, for a given input string of six binary digits, the output string would be the next string shown in FIG. 5 if one clock cycle were used, or a subsequent string if additional cycles were used.

Encryption circuits 35 could be implemented differently. For example, each encryption circuit 35 could be a look-up table, which stores the desired output for each possible input. In this case, decryption circuit 315 might be a pseudo-random sequencer, and as discussed above, the look-up table would have been loaded in such a way that for each potential sequence of digits in the unencrypted/decrypted data, that sequence would be translated into another sequence that, when passed through the pseudo-random sequencer, would be converted back to the original sequence. Or each encryption circuit could rely on a completely different encryption technology. Alternatively, all of the encryption circuits 35 could be replaced by a single microprocessor that can perform several different encryption algorithms. Taking that case further, the encryption could be carried out within workstation 33 itself, with the encryptions stored in workstation 33 at 330.

Similarly, while data compression can be carried out using compression circuit 36, the compression scheme also could be carried out in a separate microprocessor, or in workstation 33 where it could be stored at 331. However it may be carried out, a suitable compression scheme, as described above, is Golomb encoding. Golomb encoding is particularly well suited to compression of programmable logic device programming data, which have large numbers of zeroes. In Golomb encoding, the data to be compressed are parsed until a one is encountered. As long as only zeroes are encountered, each group of k zeroes, where k is any desired integer, is represented in the compressed data by a single zero. When a one is encountered, the one is represented in the compressed data by a one, followed by a binary remainder having $\log_2 k$ digits, representing the number of zeroes encountered after the last full group of k zeroes and before the one. In one example, k=4, in which case every four zeroes in the original data are represented by a single zero in the compressed data, and the remainder has $\log_2 4=2$ digits, which are used to indicate that the number of zeroes before a one, and not part of a group of four, is none, one, two or three. Examples of Golomb encoding for the case of k=4 are shown in FIG. 6.

To decompress the compressed programming data, if Golomb encoding is used for compression, decompression circuit 360, or any other suitable decompression tool such as a programmed microprocessor, translates each zero in the compressed data into k zeroes, until a one is encountered in the compressed data. When a one is encountered, decompression circuit 360 treats the next $\log_2 k$ digits as a remainder and places in the decompressed data a number of zeroes represented by that remainder, and then places a one.

Although in system 30, decompression circuit 360 is shown as being part of nonvolatile storage 312, it can also be part of programming circuit 313. In such a case, the compression scheme would serve as a second level of encryption that would be encountered by a would-be copyist, who would have to successfully decompress the programming data even before attempting to decrypt them. If the system were so designed, using compression as a second level of encryption, security could be further enhanced by providing a plurality of possible compression schemes, just as there can be a plurality of possible encryptions. Such a system is shown in FIG. 7.

System 70 includes a user station 71 and a programmable logic device 72. Like user station 31 of system 30, user station 71 of system 70 preferably includes a workstation 33, one or more encryption circuits 35 selected by switches 350 under control of an encryption selection made by the user or by the software in workstation 33 (although encryption could be carried out, as in system 30, by software stored in workstation 33 at 330), and a programmable logic device programming interface 34 to which programmable logic device 72 can be connected, preferably by a socket represented by the connection 340. Unlike user station 31, user station 71 also preferably has a plurality of compression circuits 36, rather than one. A particular compression circuit 36 preferably would be selected, preferably at random, by the user or by the programming software in workstation 33, which preferably would send a signal actuating one of switches 351 to select the desired compression circuit 36 (although compression could be carried out, as in system 30, by software stored in workstation 33 at 731). Because more than one compression is possible, compression circuit 36 also would add, to the compressed data, uncompressed data indicating which of the available compression schemes was used. If Golomb encoding is used, the various compression circuits 36 could implement Golomb encoding with different values of k, and in that case the compression selection data could be as simple as the value of k.

Programmable logic device 72 is preferably similar to programmable logic device 32, having nonvolatile storage 712 and SRAM-based programmable logic array 711. Like nonvolatile storage 312, nonvolatile storage 712 preferably is EPROM storage, but unlike nonvolatile storage 312, nonvolatile storage 712 has no decompression circuit. The programming data transferred over connection 730 to programmable logic array 711 are compressed.

Programmable logic array 711 is similar to programmable logic array 311, differing in programming circuit 713. Like programming circuit 313, programming circuit 713 preferably has encryption detect/select 314 which preferably reads encryption selection data from the encrypted programming data to select one of decryption circuits 315, preferably be actuating the correct one of switches 316. Unlike programming circuit 313, however, programming circuit 713 also preferably has compression detect/select 714 which preferably reads compression selection data from the compressed programming data to select one of decompression circuits 360, preferably by actuating the correct one of switches 716. Compression detect/select 714 and decompression circuit 360 operate before encryption detect/select 314 and decryption circuit 315. In particular, the encryption selection data are preferably compressed along with all the other data (except for the compression selection data which cannot be compressed), so they must be decompressed before decryption can occur.

The decrypted, decompressed programming data preferably are output by programming circuit 713 via connection 717 to shift register 20 as above, for programming into columns 23 of SRAM programming bits via buffer 22.

Thus it is seen that an SRAM-based programmable logic device, with nonvolatile storage, that is nevertheless secure against copying of the programming data, and that can rely if desired on multiple levels of security, has been provided. One skilled in the art will appreciate that the present invention can be practiced by other than the described embodiments, which are presented for purposes of illustration and not of limitation, and the present invention is limited only by the claims which follow.

What is claimed is:

1. A method for use with an integrated circuit programmable logic device, said integrated circuit programmable logic device having working memory for storing digital programming data specifying a desired logic configuration of said integrated circuit programmable logic device and having associated therewith storage memory from which said digital programming data are loaded into said working memory, said method being for securing said digital programming data, said method comprising the steps of:

providing an encryption device capable of encrypting data in accordance with a plurality of encryption schemes;

selecting one of said plurality of encryption schemes and encrypting said digital programming data therewith;

storing said encrypted digital programming data in said storage memory;

storing also, in said storage memory, encryption selection data identifying said one of said plurality of encryption schemes;

providing a decryption device in said programmable logic integrated circuit device capable of executing a plurality of decryption schemes corresponding to said plurality of encryption schemes; and reading said encrypted digital programming data from said storage memory for loading said digital programming data into said working memory, said reading step comprising the steps of:

selecting one of said plurality of decryption schemes corresponding to said one of said plurality of encryption schemes, and decrypting said encrypted digital programming data using said selected one of said plurality of decryption schemes.

2. The method of claim 1 wherein:

said reading step further comprises detecting said encryption selection data; and said decryption selection step comprises selecting said one of said plurality of decryption schemes based on said encryption selection data.

3. The method of claim 1 further comprising writing said decrypted digital programming data into said working memory.

4. The method of claim 1 further comprising the step of compressing said encrypted digital programming data before said step of storing said encrypted digital programming data.

5. The method of claim 4 wherein said compressing step comprises also compressing said encryption selection data.

6. The method of claim 5 further comprising the step of decompressing said compressed data before said reading step.

7. The method of claim 6 wherein:

said reading step further comprises detecting said encryption selection data;

said decompressing step occurs prior to said detecting step; and said decryption selection step comprises selecting said one of said plurality of decryption schemes based on said encryption selection data.

8. The method of claim 4 further comprising the step of decompressing said compressed data before said reading step.

9. The method of claim 4 wherein said compressing step comprises:

providing at least one compression scheme; and selecting one of said at least one compression scheme and compressing said encrypted digital programming data therewith.

10. The method of claim 9 wherein said step of storing said encrypted digital programming data comprises storing also, in said nonvolatile memory, compression selection data identifying said one of said at least one compression scheme.

11. The method of claim 10 further comprising the step of decompressing said compressed data before said reading step.

12. The method of claim 11 wherein said decompressing step comprises:

providing at least one decompression scheme corresponding to said at least one compression scheme;

decoding said compression selection data; and selecting one of said at least one decompression scheme corresponding to said one of said at least one compression scheme based on said compression selection data.

13. The method of claim 1 wherein said plurality of encryption schemes comprises at least one pseudo-random sequence.

14. The method of claim 13 wherein said plurality of decryption schemes comprises at least one look-up table, each of said at least one look-up table corresponding to one of said at least one pseudo-random sequence.

15. A system for securing digital programming data of an integrated circuit programmable logic device, said integrated circuit programmable logic device having working memory for storing digital programming data specifying a desired logic configuration of said integrated circuit programmable logic device and having associated therewith storage memory from which said digital programming data are loaded into said working memory, said system comprising:

at least one encryption device, said at least one encryption device being capable of encrypting data in accordance with a plurality of encryption schemes;

an encryption selector for selecting one of said plurality of encryption schemes and encrypting said digital programming data therewith;

a storage controller for storing, in said storage memory, said encrypted digital programming data and encryption selection data identifying said one of said plurality of encryption schemes;

at least one decryption device for decrypting each of said plurality of encryption schemes; and a programming data reader for reading said encrypted digital programming data from said storage memory for loading said encrypted digital programming data into said working memory, said programming data reader comprising:

a decryption selector for selecting one of said at least one decryption device for decrypting said one of said plurality of encryption schemes, said selected decryption device decrypting said encrypted digital programming data.

16. The system of claim 15 wherein:

said programming data reader further comprises a detector for detecting said encryption selection data; and said decryption selector selects said one of said at least one decryption device for decrypting said one of said plurality of encryption schemes based on said encryption selection data.

17. The system of claim 15 further comprising a data writer for writing said decrypted digital data into said working memory.

18. The system of claim 15, further comprising at least one data compressor, one of said at least one data compressor compressing said encrypted digital programming data output from said one of said at least one encryption device and outputting said compressed encrypted digital programming data for storage in said storage memory.

19. The system of claim 18 wherein:

said storage controller stores also, in said storage memory, encryption selection data identifying said one of said at least one encryption scheme; and said one of said at least one data compressor also compresses said encryption selection data.

20. The system of claim 19 wherein said programming data reader further comprises at least one data decompressor, corresponding to said at least one data compressor, for decompressing said compressed encrypted digital programming data and said compressed encryption selection data and outputting said decompressed data to said programming data reader.

21. The system of claim 20 wherein:

said programming data reader further comprises a detector for detecting said encryption selection data; and said decryption selector selects said one of said at least one decryption device for decrypting said one of said plurality of encryption schemes based on said encryption selection data.

22. The system of claim 18 further comprising at least one data decompressor, corresponding to said at least one data compressor, for decompressing said compressed data and outputting said decompressed data to said programming data reader.

23. The system of claim 18 wherein said storage controller stores also, in said storage memory, compression selection data identifying said one of said at least one data compressor.

24. The system of claim 23 further comprising at least one data decompressor, corresponding to said at least one data compressor, for decompressing said compressed data and outputting said decompressed data to said programming data reader.

25. The system of claim 24 wherein said programming data reader further comprises:

a decoder for detecting said compression selection data; and a decompression selector for selecting one of said at least one data decompressor, corresponding to said one of said at least one data compressor, based on said compression selection data.

26. The system of claim 15 wherein said at least one encryption device comprises at least one pseudo-random sequencer.

27. The system of claim 26 wherein said at least one decryption device for decrypting said one of said plurality of encryption schemes comprises at least one look-up table, each of said at least one look-up table corresponding to one of said at least one pseudo-random sequencer.

28. The system of claim 15 wherein said at least one encryption device comprises at least one look-up table.

29. The system of claim 28 wherein said at least one decryption device for decrypting said one of said plurality of encryption schemes comprises at least one pseudo-random sequencer, each of said at least one pseudo-random sequencer corresponding to one of said at least one look-up table.

30. The system of claim 15, further comprising a data compressor for compressing said encrypted digital programming data and outputting said compressed encrypted digital programming data for storage in said storage memory.

31. An integrated circuit programmable logic device comprising:

working memory for storing digital programming data specifying a desired logic configuration of said integrated circuit programmable logic device;

a port for receiving said digital programming data in encrypted form from a storage memory associated with said programmable logic device, said encrypted form being created by one of a plurality of encryption schemes, and for receiving from said storage memory encryption selection data identifying said one of said plurality of encryption schemes;

programming circuitry for reading said encrypted digital programming data received at said input port from said working memory, said programming circuitry comprising:

at least one decryption device for decrypting said one of said plurality of encryption schemes, and a decryption selector for selecting one of said at least one decryption device for decrypting said one of said plurality of encryption schemes, said selected decryption device decrypting said encrypted digital programming data.

32. The integrated circuit programmable logic device of claim 31 wherein:

said programming circuitry further comprises a detector for detecting said encryption selection data; and said decryption selector selects said one of said at least one decryption device for decrypting said one of said plurality of encryption schemes based on said encryption selection data.

33. The integrated circuit programmable logic device of claim 31 wherein said at least one decryption device for decrypting said one of said plurality of encryption schemes comprises at least one look-up table, each of said at least one look-up table corresponding to one of said plurality of encryption schemes.

34. The integrated circuit programmable logic device of claim 31 wherein said at least one decryption device for decrypting said one of said plurality of encryption schemes comprises at least one pseudo-random sequencer, each of said at least one pseudo-random sequencer corresponding to one of said encryption schemes.

35. The integrated circuit programmable logic device of claim 31 wherein:

said encrypted digital programming data are received at said input port from said storage memory in compressed form; and said integrated circuit programmable logic device further comprises decompression circuitry for decompressing said compressed encrypted digital programming data and outputting said decompressed data to said decryptor selector.

36. The integrated circuit programmable logic device of claim 35 wherein:

said encrypted digital programming data are received from said storage memory, in compressed form produced according to one of at least one compression scheme, along with compression selection data identifying said one of said at least one compression scheme; and said decompression circuitry comprises:
  at least one data decompressor, each said at least one data decompressor corresponding to one of said at least one compression scheme,
  a decoder for decoding said compression selection data, and
  a decompressor selector for selecting one of said at least one data decompressor based on said compression selection data.

37. The integrated circuit programmable logic device of claim 35 wherein:

said encryption selection data also are received from said storage memory in compressed form; and said decompression circuitry further decompresses said compressed encryption selection data.

38. The integrated circuit programmable logic device of claim 35 wherein said decompression circuitry is in said programming circuitry.

39. The integrated circuit programmable logic device of claim 31 wherein:

said encrypted digital programming data are received at said input port from said storage memory in compressed form; and said programmable logic device further comprises decompression circuitry for decompressing said compressed encrypted digital programming data and outputting decompressed encrypted digital programming data.

40. The integrated circuit programmable logic device of claim 39 wherein:

said encrypted digital programming data are received from said storage memory, in compressed form produced according to one of at least one compression scheme, along with compression selection data identifying said one of said at least one compression scheme; and said decompression circuitry comprises:
  at least one data decompressor, each said at least one data decompressor corresponding to one of said at least one compression scheme,
  a decoder for decoding said compression selection data, and
  a decompressor selector for selecting one of said at least one data decompressor based on said compression selection data.

41. The integrated circuit programmable logic device of claim 39 wherein said decompression circuitry is in said programming circuitry.

* * * * *